(12) United States Patent
Shanker et al.

(10) Patent No.: US 12,089,697 B2
(45) Date of Patent: *Sep. 17, 2024

(54) FOOTWEAR INSERT FORMED FROM A COMPOSITE ASSEMBLY HAVING ANTI-PUNCTURE AND ANISOTROPIC PROPERTIES

(71) Applicant: Carbitex, Inc., Kennewick, WA (US)

(72) Inventors: Arjun Shanker, Richland, WA (US); Scott Calvin Woolley, Kennewick, WA (US); Tyler Ross Carpenter, Richland, WA (US)

(73) Assignee: Carbitex, Inc., Kennewick, WA (US)

( * ) Notice: Subject to any disclaimer, the term of this patent is extended or adjusted under 35 U.S.C. 154(b) by 306 days.

This patent is subject to a terminal disclaimer.

(21) Appl. No.: 17/398,958

(22) Filed: Aug. 10, 2021

(65) Prior Publication Data

US 2022/0061456 A1 Mar. 3, 2022

Related U.S. Application Data

(63) Continuation of application No. 15/987,858, filed on May 23, 2018, now Pat. No. 11,109,639.

(51) Int. Cl.
*A43B 7/32* (2006.01)
*A43B 13/04* (2006.01)
(Continued)

(52) U.S. Cl.
CPC .............. *A43B 7/32* (2013.01); *A43B 13/04* (2013.01); *A43B 13/12* (2013.01); *A43B 13/141* (2013.01);
(Continued)

(58) Field of Classification Search
None
See application file for complete search history.

(56) References Cited

U.S. PATENT DOCUMENTS 4,356,227 A 10/1982 Stenzenberger
4,623,574 A 11/1986 Harpell et al.
(Continued)

FOREIGN PATENT DOCUMENTS

DE 10103054 C1 1/2002
DE 102005050861 A1 5/2007
(Continued)

OTHER PUBLICATIONS

Properties of Carbon Fiber—Clearwater Composites, LLC webpage http://www.clearwatercomposites.com/resources/Propertiesofcarbonfiber, archived Dec. 20, 2014, accessed May 19, 2017.

(Continued)

*Primary Examiner* — Jila M Mohandesi
(74) *Attorney, Agent, or Firm* — Perkins Coie LLP

(57) ABSTRACT

A footwear assembly having an upper configured to receive a foot and a sole assembly integrally connected to the upper. The sole assembly includes an outsole and a midsole coupled between the upper and the outsole. The sole assembly also includes a footwear insert coupled to the midsole having anisotropic and anti-puncture properties so as to provide protection, support, and stability to the foot of a wearer of the footwear assembly while still allowing for flexibility. The footwear insert is formed from a soft, dorsal layer having woven fabric, a hard, plantar layer formed from a fiber reinforced composite material bonded to the dorsal layer, and an interfacing polymer layer interposed between the dorsal and plantar layers and used to bond the two layers together. The layered arrangement has a high resistance to bending in a first direction and a low resistance to bending in an opposing second direction.

19 Claims, 7 Drawing Sheets

(51) Int. Cl.

| | | |
|---|---|---|
| A43B 13/12 | (2006.01) | |
| A43B 13/14 | (2006.01) | |
| A43B 13/16 | (2006.01) | |
| B32B 5/02 | (2006.01) | |
| B32B 5/06 | (2006.01) | |
| B32B 5/26 | (2006.01) | |
| B32B 7/12 | (2006.01) | |
| B32B 27/12 | (2006.01) | |
| B32B 27/28 | (2006.01) | |
| B32B 27/34 | (2006.01) | |
| D03D 1/00 | (2006.01) | |
| D03D 15/267 | (2021.01) | |
| A43B 5/00 | (2022.01) | |

(52) U.S. Cl.
CPC ............. *A43B 13/16* (2013.01); *B32B 5/024* (2013.01); *B32B 5/06* (2013.01); *B32B 5/26* (2013.01); *B32B 7/12* (2013.01); *B32B 27/12* (2013.01); *B32B 27/285* (2013.01); *B32B 27/34* (2013.01); *D03D 1/00* (2013.01); *D03D 1/0041* (2013.01); *D03D 15/267* (2021.01); *A43B 5/002* (2013.01); *B32B 2260/021* (2013.01); *B32B 2260/046* (2013.01); *B32B 2262/0253* (2013.01); *B32B 2262/0269* (2013.01); *B32B 2262/101* (2013.01); *B32B 2307/581* (2013.01); *B32B 2437/02* (2013.01); *D10B 2321/0211* (2013.01); *D10B 2331/021* (2013.01); *D10B 2331/04* (2013.01); *D10B 2401/063* (2013.01); *D10B 2501/043* (2013.01)

(56) References Cited

U.S. PATENT DOCUMENTS

| | | | |
|---|---|---|---|
| 5,052,130 A * | 10/1991 | Barry | A43B 5/049 |
| | | | 36/107 |
| 5,122,403 A | 6/1992 | Roginski et al. | |
| 5,191,727 A * | 3/1993 | Barry | A43B 5/06 |
| | | | 36/107 |
| 5,895,105 A | 4/1999 | Nesbitt | |
| 9,049,900 B1 * | 6/2015 | Cox | A43B 13/122 |
| 9,127,914 B2 * | 9/2015 | Millar | A43B 13/127 |
| 9,370,904 B2 | 6/2016 | Khan | |
| 9,609,911 B1 * | 4/2017 | Walsh | A43B 3/34 |
| 9,993,993 B2 * | 6/2018 | Simmons | B32B 5/26 |
| 10,093,085 B2 | 10/2018 | Simmons et al. | |
| 10,301,769 B2 | 5/2019 | Simmons et al. | |
| 10,786,973 B2 | 9/2020 | Simmons et al. | |
| 11,109,639 B2 | 9/2021 | Shanker et al. | |
| 2004/0058603 A1 | 3/2004 | Hayes et al. | |
| 2004/0086735 A1 * | 5/2004 | Monsheimer | A43B 17/003 |
| | | | 428/493 |
| 2007/0042170 A1 | 2/2007 | Morin | |
| 2008/0010863 A1 * | 1/2008 | Auger | A43B 13/14 |
| | | | 36/107 |
| 2009/0151200 A1 | 6/2009 | Niedermeyer et al. | |
| 2010/0078201 A1 | 4/2010 | Yoshizaki et al. | |
| 2010/0186257 A1 | 7/2010 | Karl et al. | |
| 2011/0167678 A1 * | 7/2011 | Peikert | A43B 7/08 |
| | | | 36/3 R |
| 2011/0260945 A1 | 10/2011 | Karasawa | |
| 2012/0313307 A1 | 12/2012 | Cartwright et al. | |
| 2013/0104422 A1 * | 5/2013 | Hatfield | A43B 7/142 |
| | | | 36/103 |
| 2013/0231022 A1 | 9/2013 | Kraatz et al. | |
| 2013/0291399 A1 * | 11/2013 | Fonte | A43B 1/04 |
| | | | 36/44 |
| 2014/0057096 A1 | 2/2014 | Moser | |
| 2014/0150291 A1 * | 6/2014 | Larsen | A43B 7/32 |
| | | | 36/44 |
| 2014/0304877 A1 * | 10/2014 | Fonte | A43B 7/32 |
| | | | 2/2.5 |
| 2016/0122482 A1 | 5/2016 | Higuchi et al. | |
| 2017/0095033 A1 * | 4/2017 | Farina | A43B 13/04 |
| 2018/0015703 A1 | 1/2018 | Fossat et al. | |

FOREIGN PATENT DOCUMENTS

| | | |
|---|---|---|
| EP | F223061 A2 | 5/1987 |
| EP | 2484710 A1 | 8/2012 |
| GB | 2466792 A | 7/2010 |
| IT | TO2015A000061 | 1/2018 |
| JP | 2012231140 A | 11/2012 |
| WO | 0151263 A1 | 7/2001 |
| WO | 2004065117 A2 | 8/2004 |
| WO | 2004089143 A2 | 10/2004 |
| WO | 2007046118 A1 | 4/2007 |
| WO | 2009076499 A1 | 6/2009 |
| WO | 2014160506 A2 | 10/2014 |
| WO | 2015012237 A1 | 1/2015 |
| WO | 2015065460 A1 | 5/2015 |
| WO | 2016120785 A1 | 8/2016 |
| WO | 2017095479 A1 | 6/2017 |

OTHER PUBLICATIONS

European Patent Office, Communication pursuant to Article 94(3) EPC, EP Patent Application 16738241.5, mailed May 14, 2019, 8 pages.

European Patent Office, Communication pursuant to Article 94(3) EPC, EP Patent Application 16754580.5, mailed Sep. 25, 2020, 4 pages.

International Searching Authority, International Preliminary Report on Patentability, PCT/US2016/044123, mailed Jun. 14, 2018, 13 pages.

International Searching Authority, International Search Report and Written Opinion, PCT Application PCT/US2016/028706, Mailed Aug. 11, 2016, 13 pages.

International Searching Authority, International Search Report and Written Opinion, PCT Application PCT/US2016/037093, Mailed Sep. 26, 2016, 14 pages.

International Searching Authority, International Search Report and Written Opinion, PCT Application PCT/US2016/044123, Mailed Sep. 21, 2016, 17 pages.

International Searching Authority, International Search Report and Written Opinion, PCT/US2019/032746, Mailed Aug. 27, 2019., 15 pages.

PCI "Lumiflon Comes to America" from pcimag.com, Sep. 1, 2002, 4 pages.

International Bureau of WIPO, International Preliminary Report on Patentability, PCT Application PCT/US2016/037093, Mailed Dec. 21, 2017, 10 pages.

* cited by examiner

FOOTWEAR INSERT FORMED FROM A COMPOSITE ASSEMBLY HAVING ANTI-PUNCTURE AND ANISOTROPIC PROPERTIES

CROSS REFERENCE TO RELATED APPLICATIONS

This application is a continuation of U.S. patent application Ser. No. 15/987,858, filed May 23, 2018, and titled FOOTWEAR INSERT FORMED FROM A COMPOSITE ASSEMBLY HAVING ANTI-PUNCTURE AND ANISOTROPIC PROPERTIES, which is incorporated herein by reference in its entirety.

TECHNICAL FIELD

This application relates in general to footwear inserts used in sole assemblies for articles of footwear and, in particular, to footwear inserts having anti-puncture and anisotropic bending properties.

BACKGROUND

In general, materials are isotropic or anisotropic. Isotropic materials have identical properties in all directions. Conversely, properties of anisotropic materials are directionally and geometrically dependent.

Many footwear products incorporate materials that provide a selected degree of stiffness while still allowing for some flexibility for bending during use. Oftentimes, however, desired characteristics within a shoe can be at odds with other desired characteristics. For example, footwear products having sole assemblies that incorporate isotropic materials configured to provide enhanced flexibility and range of motion for the wearer's foot often sacrifice structural stiffness and/or stability. Conversely, the use of isotropic materials to provide enhanced structural stiffness and stability are often at the sacrifice of flexibility.

Some footwear products also incorporate materials that provide protection and security to a wearer's foot. For example, the sole assemblies of footwear products are often designed to protect the bottom of a wearer's foot from rough and uneven terrain. However, most sole assemblies are typically formed from a relatively soft material (e.g., rubber) that offers little puncture protection from sharp objects, such as nails, screws, wires, spikes, etc. To account for this, footwear products configured to offer improved puncture resistance often include sole assemblies having puncture resistant layers formed from very stiff and rigid materials (e.g., metal, rigid plastic, etc.) or very flexible materials (e.g., fabric such as Kevlar®).

However, footwear products that incorporate puncture resistant layers formed from very stiff and rigid materials limit the flexibility of the footwear product, thereby reducing the wearer's comfort, while footwear products that incorporate puncture resistant layers formed from very flexible materials offer limited stiffness and stability, resulting in a reduced ability to distribute point loads over larger portions of the sole assembly. Accordingly, there is a need for a footwear insert that can be used as a puncture resistant layer while providing sufficient flexibility to the wearer's foot motion without limiting the stiffness, stability, and load distribution of the footwear product under foot.

DETAILED DESCRIPTION

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1:
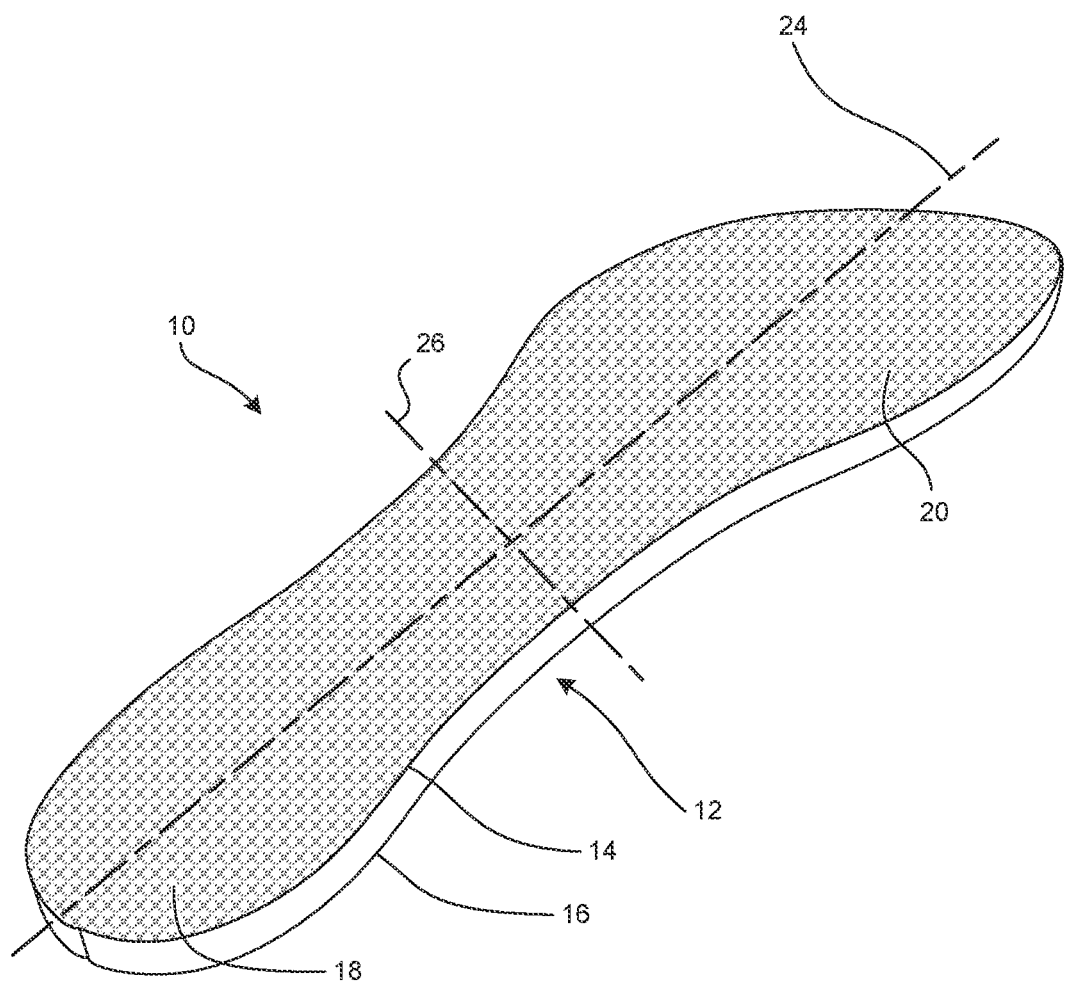
FIG. 1 is an isometric view of a footwear insert formed from a fiber-based composite assembly having anti-puncture and anisotropic properties configured in accordance with embodiments of the present technology.
Figure 2:
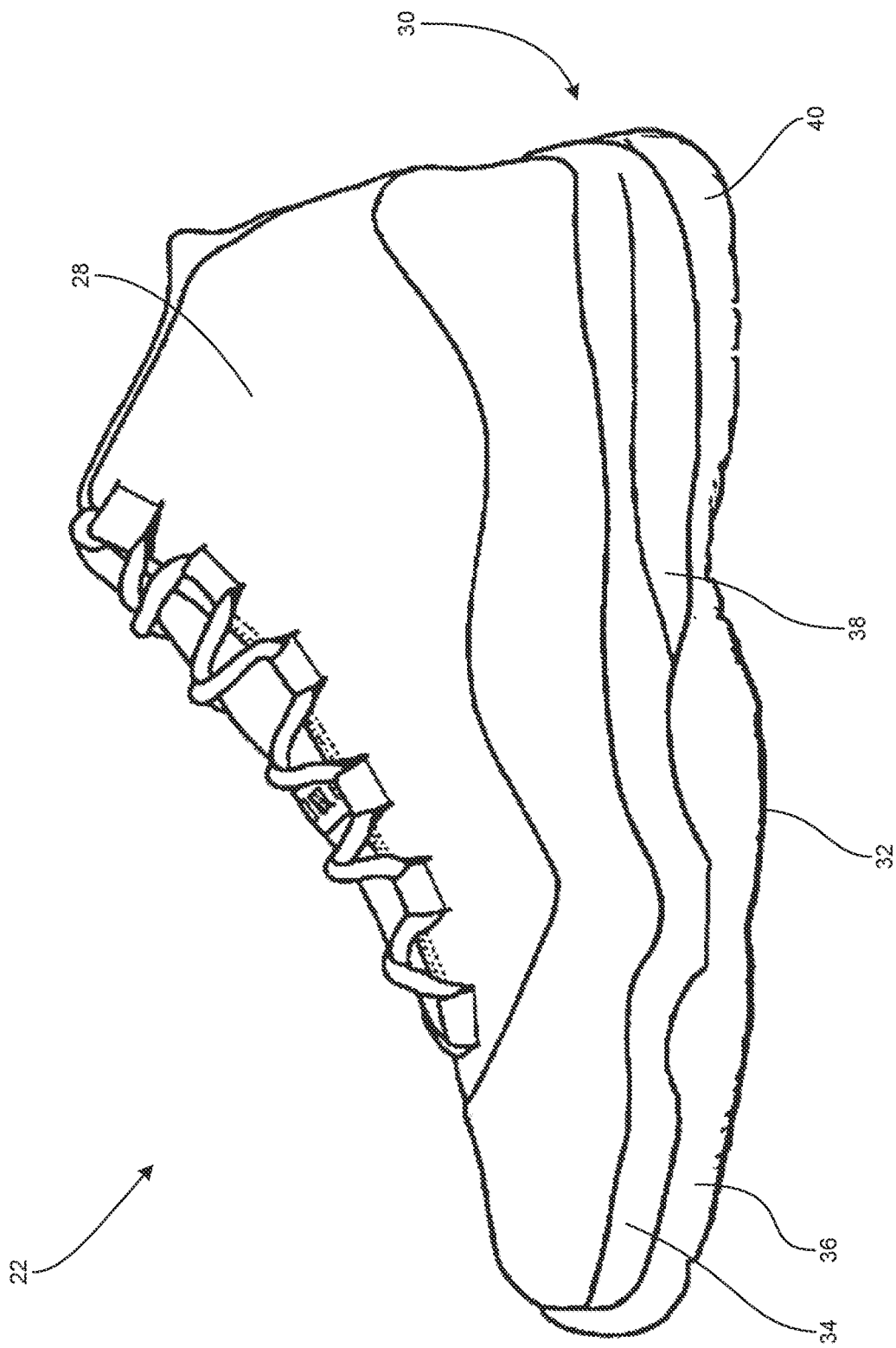
FIG. 2 is a side elevation view of a footwear assembly.

FIG. 1 depicts a footwear insert 10 having puncture-resistant and anisotropic bending properties. The insert 10 is shown in a planar, un-flexed configuration. The footwear insert 10 is formed from a composite assembly 12 that comprises a soft layer 14 formed from a woven, fiber reinforced material and a hard layer 16 formed from a fiber reinforced composite material and fixedly and permanently joined with the soft layer 14. The footwear insert 10 has a generally foot-shaped layout that includes a heel portion 18 and an opposing forefoot portion 20, where the heel portion 18 is configured to be positioned beneath a wearer's heel, and the forefoot portion 20 is configured to be positioned beneath a wearer's forefoot when the footwear insert 10 is incorporated into a footwear assembly 22 (FIG. 2). The footwear insert 10 has a longitudinal axis 24 extending substantially through both the heel portion 18 and the forefoot portion 20 and a lateral axis 26 substantially perpendicular to the longitudinal axis 24. The composite assembly 12 forming the insert 10 is a bendable planar assembly which is described herein with reference to the spatial orientation shown in FIG. 1. Accordingly, the soft layer 14 is shown in FIG. 1 as a top layer and the hard layer 16 is shown as a bottom layer. It is noted that the terms "top" and "bottom" are used for purposes of convenience to discuss orientation, and it is to be understood that the assembly can be positioned in other spatial orientations, such as an inverted orientation to that shown in FIG. 1, so that the first layer 14 is below the hard layer 16.

FIG. 2 depicts a footwear assembly 22 (e.g., a shoe) having an upper 28 shaped to receive a wearer's foot and a sole assembly 30 that may include the footwear insert 10. In some embodiments, the footwear assembly 22 may be a boot, such as a work boot, hiking boot, safety boot, or some other type of boot. In other embodiments, the footwear assembly 22 may be a shoe, such as a dress shoe, casual/life-style shoe, running shoe, cleated shoe, other athletic shoe, Oxford shoe, or other type of shoe. Additionally, the footwear assembly 22 can be a sandal or some other type of footwear. The upper 28 is fixedly attached along the bottom margin to a sole assembly 30, which includes an outsole 32 and a midsole 34, where the midsole is fixedly coupled to the outsole 32 and configured to be positioned between the upper 28 and the outsole 32. To provide puncture resistance and desirable bending/stiffness properties to the footwear assembly 22, the footwear assembly 22 may incorporate the footwear insert 10 (FIG. 1) into the sole assembly 30. The incorporated insert 10 may be coupled to the midsole 34 and may be sized and shaped such that it extends fully underfoot from a forefoot portion 36, through an arch portion 38, to a heel portion 40 of the footwear assembly 22.

Conventional footwear sole assemblies traditionally focus on one area of improvement at the sacrifice of another. For instance, a running shoe may increase flexibility and cushioning at the sacrifice of stability and protection. The increased flexibility is commonly achieved through outsole and midsole design that provides segments in the sole in flexing regions of the shoe. While this does increase flexibility, the torsional stiffness can be considerably reduced, and the plantar flex protection can be substantively sacrificed. Another instance is a hiking boot that often sacrifices flexibility for increased protection and stability. The use of rigid materials in the construction of the sole of the hiking boot increases the stiffness so as to distribute loads and reduce transmission of point loads to the wearer's foot, thereby preventing, for example, foot bruising from rocks or roots on a hiking trail.

The composite assembly 12 in the form of the footwear insert 10 of the present technology allows for footwear assemblies to have desirable flexibility in one direction substantially corresponding to the natural flex of a wearer's foot through a gate cycle without the sacrifice of the stability and protection. When integrated into the sole assembly 30, the footwear insert 10 is positioned such that the soft layer 14 is a dorsal layer configured to be facing upwardly toward a wearer's foot, while the hard layer 16 is a plantar layer configured to be layer 14 facing downwardly away from the foot towards the outsole 24. As will be discussed in further detail below, the tensile and compressive properties of both the joined soft layer 14 and the hard layer 16 cause the footwear insert 10 to have desirable anisotropic bending properties in which the footwear insert 10 has a high resistance to bending in a first direction (e.g., with the toe and/or heel portions flexing downwardly), and a low resistance to bending in an opposing second direction (e.g., with the toe and/or heel flexing upwardly). Because of these desirable bending properties, the footwear insert 10 provides stability and comfort to the wearer of the footwear assembly 22 by restricting bending of the sole assembly 30 in a plantar flex direction without adversely affecting bending in a dorsal flex direction.

Figure 3:
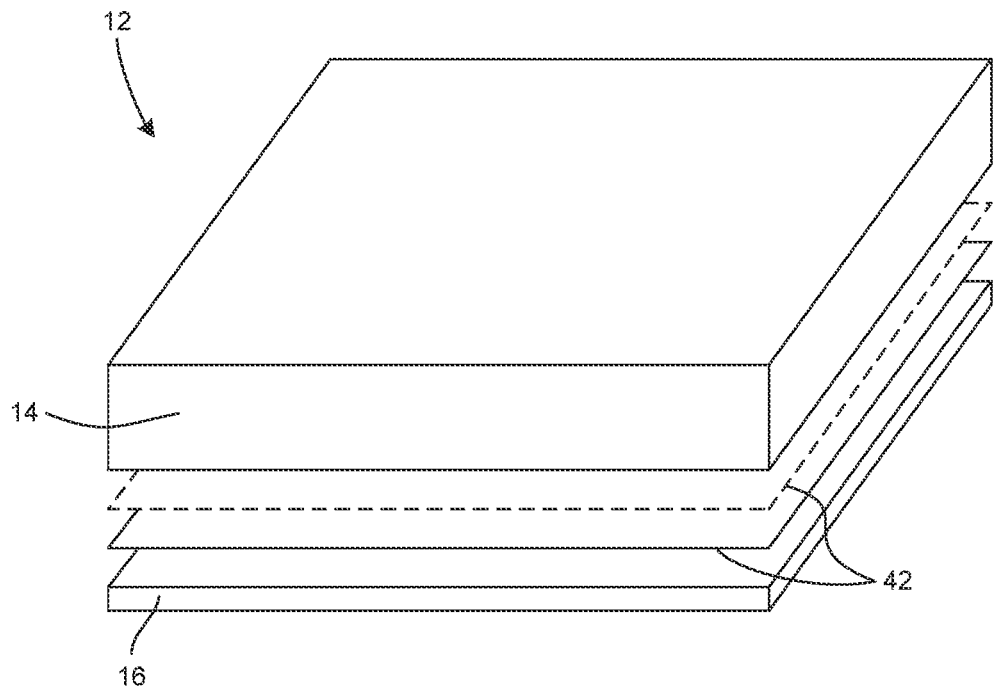
FIG. 3 is an exploded isometric view of the composite assembly forming the insert of FIG. 1.

FIG. 3 depicts an exploded view of the composite assembly 12. The soft layer 14 comprises a woven material formed from multiple layers of fabric stacked and coupled together and configured to act as a puncture resistant layer that resists and/or prevents penetration by sharp objects such as nails, screws, and the like. The layers of fabric are each formed from fiber bundles densely woven together into a fine mesh having warp fiber bundles woven with weft fiber bundles, where the warp fiber bundles are substantially parallel to each other and the weft fiber bundles are substantially parallel to each other. The fiber bundles are formed from a non-rigid fibrous material. For example, in a preferred embodiment, the fiber bundles are formed from polyester fibers and the woven material is a polyester material. In other embodiments, the non-rigid fabric is formed from Kevlar, Dyneema (i.e., ultra-high molecular weight polyethylene), or some other flexible woven fabric. The individual layers of fabric are stacked together and mechanically bonded (e.g., stitched, needled, etc.) to each other in a multi-layer arrangement. In this stacked configuration, the soft layer 14 may have a thickness in the range of between approximately 2.0 mm-5.0 mm. In one embodiment, the soft layer 14 has a thickness of approximately 4 mm. To promote further bonding and adhesion between the individual layers of fabric, the soft layer 14 may also include a bonding agent (i.e., a binder or adhesive) applied to the fabric layers so as to further bind the individual layers to each other. Although the illustrated embodiment has a soft layer 14 is a puncture resistant layer made of a woven material formed from multiple layers of fabric stacked and coupled together, the soft layer 14 in other embodiments can be a puncture resistant layer made of other anti-puncture fabric weaves that can have multiple layers of dense fibers bonded, stitched, or pressed together.

The fibers in the fabric of the illustrated embodiment may be woven such that the warp and weft fiber bundles are oriented at a selected angle relative to each other and/or relative to the longitudinal axis 24 and the lateral axis 26. In the illustrated embodiment, the warp and weft fiber bundles are woven at approximately a 90-degree orientation relative to each other. In some embodiments, each of the layers of fabric may have a common orientation with respect to the longitudinal and lateral axes 24 and 26. For example, each of the layers of fabric may be oriented such that the warp fiber bundles are substantially parallel to the longitudinal axis 24. In other embodiments, however, each of the layers of fabric may not be oriented in a common orientation. For example, a first of the layers of fabric may be oriented such that its warp fiber bundles are parallel to the longitudinal axis 24 while a second of the layers of fabric is oriented such that its warp fiber bundles are oriented at an angle of approximately 30-degrees with respect to the longitudinal axis 24.

The hard layer 16 comprises a fiber-reinforced composite material. More specifically, the hard layer 16 comprises a rigid epoxy plate having one or more layers of fibers woven together and impregnated with an epoxy. In a preferred embodiment, the fibers comprise synthetic fibers, such as fiberglass fibers, and the epoxy comprises a cured thermoset epoxy. In other embodiments, the synthetic fibers comprise carbon fibers or some other type of fiber, and the epoxy comprises thermoplastic polyurethanes, thermoplastic elastomers, thermoplastic polyolefins, silicone, acrylates, polyamides, polyurethanes, nitrile and butyl rubbers, and styrenic block copolymers. Other materials and arrangements from which the soft layer 14 and the hard layer 16 may be formed are described in U.S. patent application Ser. No. 15/220,352, titled JOINED FIBER-REINFORCED COMPOSITE MATERIAL ASSEMBLY WITH TUNABLE ANISOTROPIC PROPERTIES, filed Jul. 26, 2016, which is incorporated by reference herein.

With this stacked and layered arrangement, the composite assembly 12 acts as a puncture resistant assembly capable of preventing or inhibiting penetration of a foreign objection. For example, the rigid epoxy plate of the hard layer 16 provides impact resistance and maintains overall stiffness of plate when impacted by an object. If the object is able to penetrate through the hard layer 16, however, the soft layer 14 adds further puncture resistance. The bonded and overlapping fabric layers of the soft layer 14 are flexible enough to absorb the penetrating objects force and prevent penetration. In addition, when a wearer steps on an object that could puncture a conventional sole assembly, the object applies a point load on a portion of the insert 10, which causes a portion of the insert 10 at the load point to flex in the plantar flex direction, which puts the fibers in the soft layer in tension, thereby tightening the fibers together, which further resists and prohibits penetration of the object through the insert to the wearer's foot. As such, the woven fabric merely bends and deforms without breaking and the stacked layers compress into each other without breaking.

Before the composite assembly 12 is finally assembled and cured, the hard layer 16 includes the woven reinforcing fibers impregnated with uncured epoxy. To form the composite assembly 12, the soft layer 14 is positioned on top of the hard layer 16 and the composite assembly 12 is exposed to heat and pressure (e.g., via a heat press) in order to cure the epoxy and bond the two layers 14 and 16 together. When exposed to the elevated heat and pressure, the uncured epoxy of the hard layer 16 diffuses partially into the soft layer 14 and impregnates or otherwise adheres to at least some of the woven fabric of the soft layer 14. However, if care is not taken, the uncured epoxy may diffuse across the entirety of the soft layer 14 and impregnate at least most of the woven fabric before curing and hardening. If this happens, the cured epoxy may be too dispersed throughout both of the layers 14 and 16 to provide the desired amount of rigidity to the hard layer 16, resulting in the composite assembly 12 being too rigid and the footwear insert 10 not having the desired bending properties. In another embodiment, the composite assembly 12 may be formed by curing the epoxy of the hard layer 16 as an initial process, then in a secondary process position the soft layer 14 on the hard layer 16 and apply sufficient heat and pressure so as to fixedly bond the soft layer 14 to the hard layer 16.

As shown in FIG. 3, the composite assembly 12 of the illustrated embodiment also includes at least one interfacing layer 42 positioned between the soft layer 14 and the hard layer 16. The interfacing layer 42 is formed from one or more thin sheets of polymer and is configured to act as an adhesive that bonds the soft layer 14 to the hard layer 16 while simultaneously preventing the unrestricted flow of uncured epoxy. In a preferred embodiment, the interfacing layers 42 are elastomeric bonding layers formed from sheets of a block copolymer, such as a polyether block amide (e.g., PEBAX 2533), having a thickness in the range of approximately 0.004-0.012 inches (0.1 mm-0.3 mm), and more preferably a thickness of approximately 0.008 inches (0.2 mm) and having polymer chains arranged in a network. During the curing process, the thermal energy and pressure used to cure the epoxy in the hard layer 16 also causes the polymer chains to begin to flow and move around, becoming partially embedded within the soft and hard layers 14 and 16. The heat and pressure causes cross-linking between adjacent polymer chains that prevents/limits further movement of the polymer chains, causing the polymer to harden and cure. In this way, the soft layer 14, the hard layer 16, and the interfacing layer 42 are co-cured together to form the composite assembly 12. Once cured, the polymer chains, which now span between the woven fabric and the composite material, permanently bind the two layers together. The cross-linked polymer chains also act as a semipermeable barrier that limits the flow of the epoxy material into the soft layer 14 from the hard layer 16 during the curing process. While a small portion of the uncured epoxy may be able to flow through the interfacing layer 42, the majority of the epoxy material is not, thereby ensuring that most of the epoxy remains within the hard layer 16 and that the hard layer 16 has a sufficient stiffness and rigidity, which is greater than that of the soft layer 14, after the curing process is completed.

Figure 4:
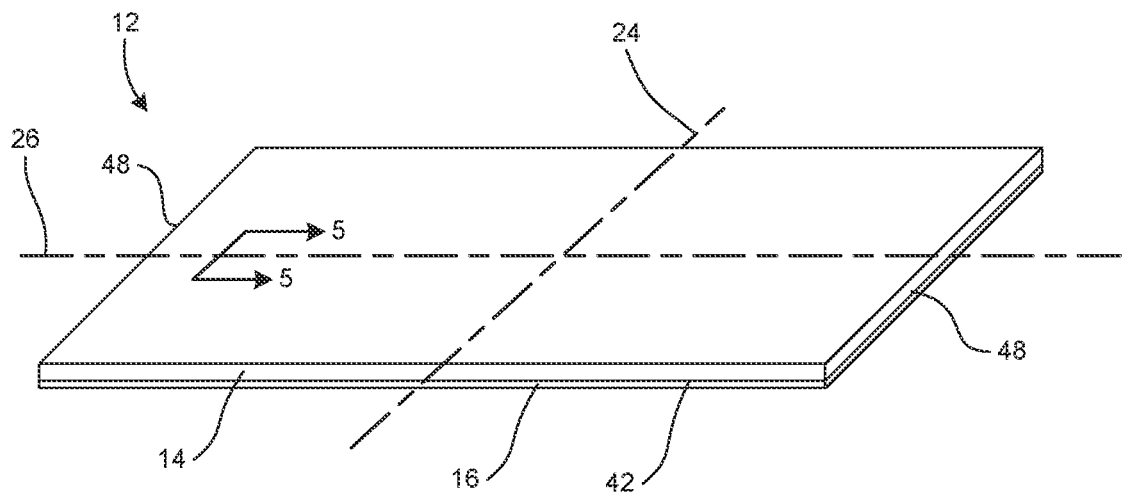
FIG. 4 is an isometric view of the composite assembly of FIG. 3 shown in a planar, un-flexed configuration in accordance with embodiments of the present technology.
Figure 5:
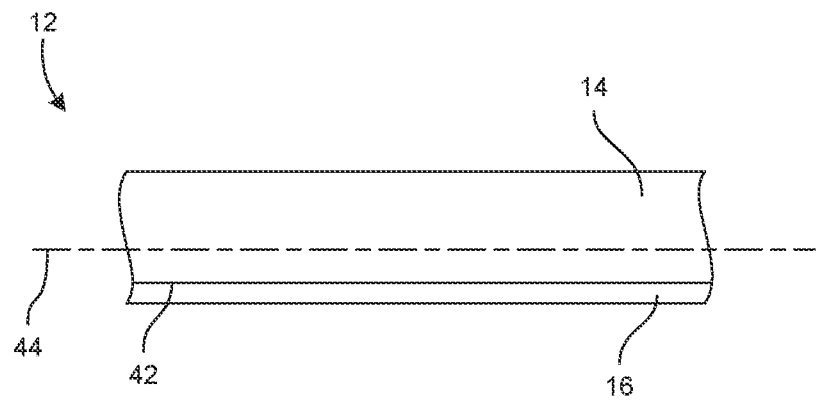
FIG. 5 is an enlarged cross-sectional view taken substantially along line 5-5 of FIG. 4 showing the top and bottom layers of the composite assembly configured in accordance with an embodiment of the present technology.
Figure 6:
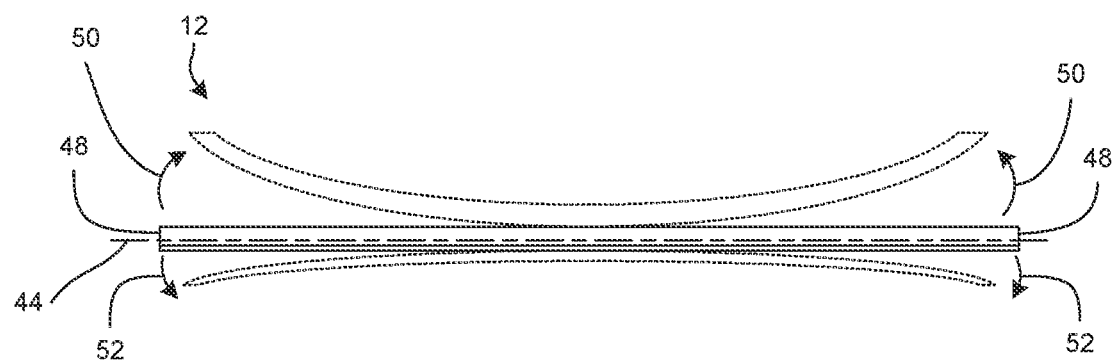
FIG. 6 is a schematic side elevation view of the insert of FIG. 1 shown in an upward deflection configuration (broken lines), neutral configuration (solid lines), and a downward deflection configuration (broken lines).

FIG. 4 shows an isometric view of a segment of the composite assembly 12 having opposing ends 48 and arranged in a planar and relaxed position (i.e., a neutral orientation), and FIG. 5 shows a cross-sectional view of the composite assembly 12 taken along line 5-5 of FIG. 3. The assembly 12 has a neutral bending plane 44 near the bottom of the soft layer 14 and substantially parallel to the interfacing layer 42. In a beam or other planar object, the neutral bending plane represents the theoretical plane that separates the portions of the object in tension from the portions in compression when the object is bent. For example, when bending the composite assembly 12, portions of the composite assembly 12 on one side of the neutral bending plane 44 are in tension, while the portions on the opposing side are in compression. More specifically, bending the composite assembly 12 about the lateral axis 24 such that the opposing ends 48 move in a generally upward direction (as shown in FIG. 6) causes the portions of the composite assembly 12 above the neutral bending plane 44 to be in compression and the portions below the neutral bending plane 44 to be in tension. Conversely, bending the composite assembly 12 such that the opposing ends 48 move in a generally downward direction causes the portions of the composite assembly 12 above the neutral bending plane 44 to be tension and the portions below the neutral bending plane 44 to be in compression.

Because the different portions of the composite assembly 12 are placed in either tension or compression when the composite assembly 12 is bent, the bending properties (e.g., the resistance to bending in a given direction) of the composite assembly 12 are dependent on the tensile and compressive properties of the different portions of the composite assembly 12. More specifically, the bending properties of the composite assembly 12 are dependent on the tensile and compressive properties of both the woven material of the soft layer 14 and the fiber-reinforced composite material of the hard layer 16.

FIG. 6 depicts the composite assembly 12 in an upward deflection configuration, a neutral configuration, and a downward deflection configuration. When the composite assembly 12 is forced into the upward deflection configuration, all of the material above the neutral bending plane 44 (i.e., a majority of the woven fabric of the soft layer 14) is in compression while all of the material below the neutral bending plane 44 (i.e., the rest of the woven fabric of the soft layer 14 and all of the hard layer 16) is in tension, and the opposing ends 48 of the composite assembly 12 have an upward deflection 50. Conversely, when the composite assembly 12 is forced into the downward deflection configuration, the material above the neutral bending plane 44 is in tension while the material below the neutral bending plane is in compression and the opposing ends 48 have a downward deflection 52.

The differences between the tensile and flexural properties of the joined soft and hard layers 14 and 16 are such that the composite assembly 12 has anisotropic bending properties. Accordingly, when the composite assembly 12 is bent via a force or load (i.e., a flexural load), if the flexural load causes an upward deflection, the extent of upward deflection 50 will be greater (i.e., the composite assembly will bend more) as compared to the extent of downward deflection 52 that will occur in response to the same flexural load applied in the opposite direction. In the illustrated embodiment, the soft layer 14 has a tensile modulus and a flexural modulus smaller than the tensile modulus and flexural modulus of the hard layer 16. In some embodiments, the soft layer 14 has a tensile modulus in the range of approximately 0.5 GPa to 15 GPa and the flexural modulus is in the range of approximately 0.01 GPa to 5 GPa. The hard layer 16, however, has a tensile modulus in the range of approximately 5 GPa to 250 GPa and the flexural modulus is in the range of approximately 1 GPa to 100 GPa.

In the illustrated embodiment, the tensile and flexural modulus of the hard layer are greater than the tensile and flexural modulus of the soft layer. For example, the ratio of the tensile modulus of the soft layer 14 vs. the hard layer 16 is in the range of approximately 1:1.5 to 1:25. In one embodiment the soft layer 14 has a tensile modulus of approximately 5 GPa and a thickness in the range of approximately 1.5 mm-5 mm, and the hard layer has a tensile modulus of approximately 30 GPa and a thickness in the range of approximately 0.1 mm-0.25 mm. In another illustrative example, one embodiment of the composite assembly 12 has the soft layer 14 made of woven polyester/Kevlar/Dyneema with a thickness of approximately 4.0 mm, a tensile modulus of approximately 7 GPa. The hard layer 16 is made of Fiberglass/Epoxy Pre Preg. with a thickness of approximately 0.2 mm, a tensile modulus of approximately 30 GPa. The resulting assembly 12 has a thickness of approximately 4.5 mm.

When the composite assembly 12 is subjected to a load causing bending in the downward deflection direction 52, the fabric of the soft layer 14 is put in tension. As the soft layer 14 has a higher tensile modulus than its own flexural modulus, it resists the deflection of the composite assembly 12 in the downward flex direction. However, when the bending is in the opposite, upward flex direction, the fabric of the soft layer 14 is under compression. The soft layer 14 has very low rigidity and compressive/flexural modulus in comparison to the hard layer, and the fibers of the soft layer 14 are not encapsulated and restricted by a cured and hardened epoxy matrix or other material like the hard layer 16. Accordingly, the material of the soft layer 14 is a porous material. This porous configuration of the soft layer 14 provides a lower flexural modulus than a similar non-porous material, and a flexural modulus lower than its tensile modulus. On the other hand, the fiber-reinforced composite material of the hard layer 16 has a tensile modulus greater than its flexural modulus, and the cured and hardened epoxy of the hard layer 16 provides higher rigidity to the hard layer 16 in comparison to the porous soft layer 14, which does not have the rigid epoxy matrix surrounding the fibers. The epoxy matrix also restricts movement of the fibers in the fiber-reinforced composite material of the hard later in response to a flexural load. Accordingly, when a compressive, flexural load is applied in the direction of the hard layer 16 to cause bending in the downward flex direction, the higher rigidity of the hard layer 16 and the comparative higher tensile modulus of the soft layer 14 prevents the composite assembly 12 from larger deformations.

When a similar compressive/flexural load is applied in the soft layer side, the composite assembly will have large deformations in the upward flex direction due to the very low rigidity and/or flexural modulus in the soft side to allow greater bending of the composite assembly 12. The only effective rigidity in this condition is the rigidity of the hard layer 16, as the rigidity of the soft layer 14 is substantially negligible and it collapses or folds on itself as a cloth and does not possess and structure or stability in the compressive/flexural direction or the +/−Z axis of the soft sheet layer. Accordingly, movement or deformation of the synthetic fibers within the cured and hardened epoxy of the hard layer 16 are limited so as to prevent the fibers in the hard layer 16 from collapsing or folding on themselves when a flexural force is applied.

The majority of the woven fabric of the illustrated embodiment is above the neutral bending plane 44 and, with the tensile modulus of the woven fabric being larger than its flexural modulus, bending the composite assembly 12 in a downward direction requires more force than bending the composite assembly 12 in an upward direction, because more of the woven fabric is placed in tension when the assembly 12 is bent in a downward direction. As a result, the composite assembly 12 has a high resistance to bending in a downward direction while having a comparatively lower resistance to bending in an upward direction. Accordingly, in embodiments where the footwear insert 10 incorporates the composite assembly 12, the footwear insert 10 expresses similar anisotropic bending properties such that the footwear insert 10 has a high resistance to bending in a dorsal flex direction (i.e., the downward direction) and a low resistance to bending in a plantar flex direction (i.e., the upward direction). Further, when the footwear insert 10 is incorporated into a sole assembly 30 for a footwear assembly 22, the composite assembly 12 of the footwear insert 10 provides a higher resistance to bending in the plantar flex direction without significantly limiting bending in a dorsal flex direction, thereby providing stability and comfort to the wearer by preventing undesired bending of the sole assembly 30 without preventing any desired bending.

The composite assembly 12 of the illustrated embodiment does not provide much resistance to bending in a dorsal flex direction, which may occur during the transition from the flat foot stage of a gait cycle through the toe-off stage during which the wearer's foot naturally bends at the metatarsal joints. The increased flexibility helps reduce the forces required by the foot to flex the footwear assembly 22, thereby reducing fatigue which can help increase stability. Conversely, when forces on the sole assembly 30 bend the footwear insert 10 in the opposite, plantar flex direction, such as when a wearer steps on a sharp object or stands on the rung of a ladder, the soft layer 14 is under tension and therefore resists such bending. The layered and stacked arrangement of the composite assembly 12 also provides stability during a wearer's gait cycle by controlling the torsional or dorsiflexive motion that helps eliminate the foot's tendency to want to roll inward or outward (pronate and supinate). Further, during use of the footwear 10, such as running, walking, hiking, climbing ladders, etc., the sole assembly 30 is often subjected to uneven surfaces such as rocks, sidewalk cracks, sticks, ladder rungs, or other sources of unevenness that can create localized forces applied to the bottom of the wearer's foot. These localized forces can apply significant point loads to the wearer's foot. The sole assembly 30 with the integrated footwear insert 10 provides a rigid support that laterally displaces the localized forces through a high resistance to bending in the plantar flex direction. Moreover, the footwear insert 10 eliminates the need for the footwear assembly 22 to incorporate a rigid shank (e.g., a shank made from metal, ceramic, plastic shank, etc.) into the sole assembly 30 in order to provide support.

Figure 7A:
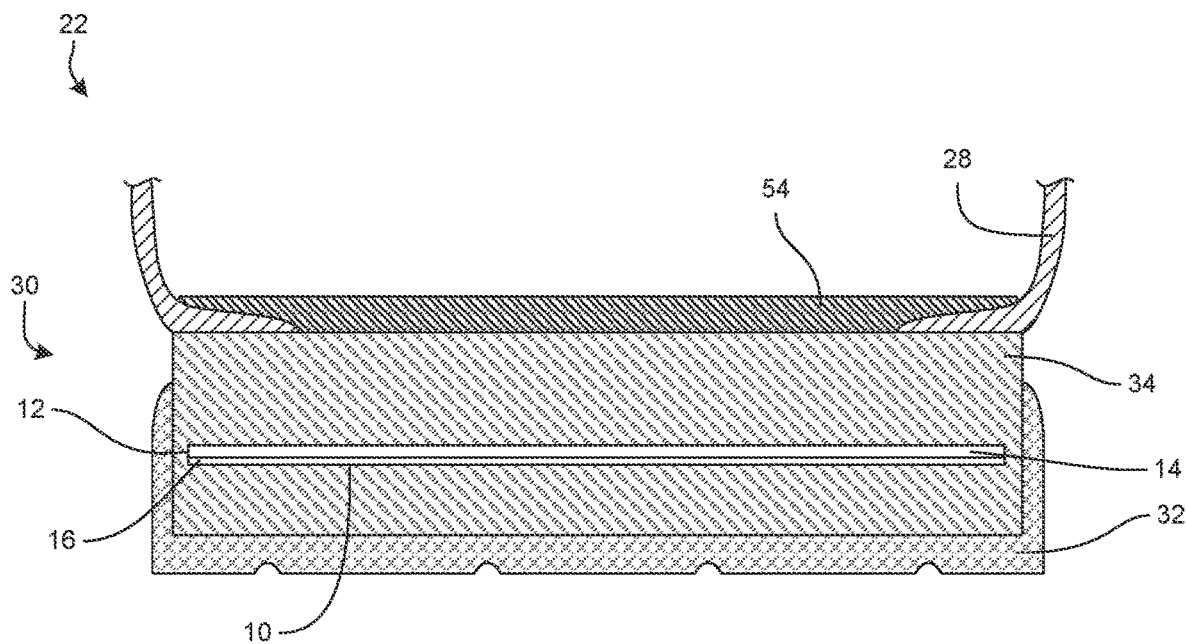
FIGS. 7A-C are schematic cross-sectional views of the footwear assembly of FIG. 2 having the footwear insert of FIG. 1 in accordance with an embodiment of the present technology.
Figure 7B:
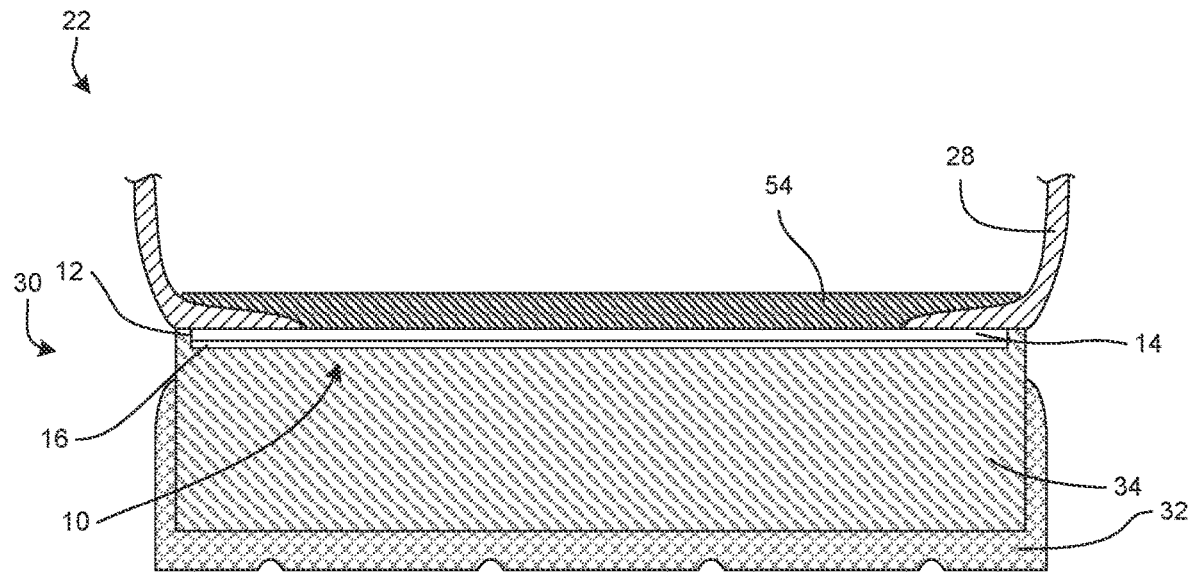
Figure 7C:
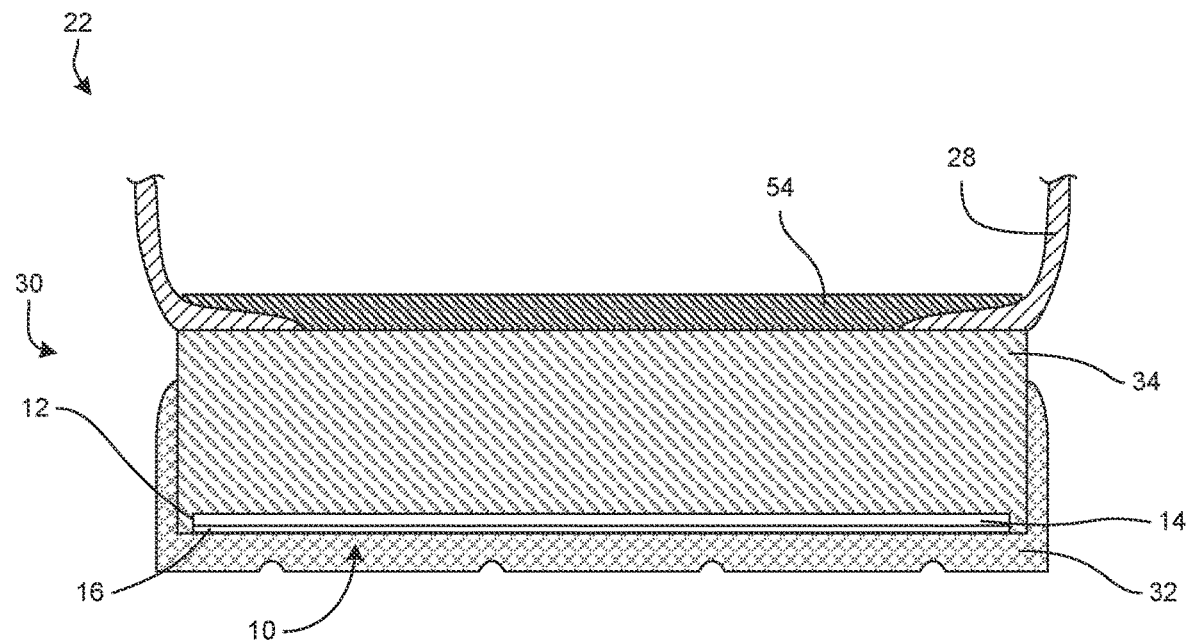

FIG. 7A shows a schematic cross-sectional view of the footwear assembly 22 having the footwear insert 10 positioned within the midsole 34 of the sole assembly 30. In this illustrated embodiment, the footwear insert 10 is embedded within and completely surrounded by the midsole and is sized and shaped to extend fully underfoot. In other embodiments, however, the footwear insert 10 may be positioned at different portions of the footwear assembly. For example, FIG. 7B depicts an embodiment in which the footwear insert 10 is positioned between the midsole 34 and the upper 28 such that the footwear insert 10 is in immediate contact with an insole board 54 while FIG. 7C depicts an embodiment in which the footwear insert 10 is positioned between the midsole and the outsole 32. In still other embodiments, the footwear insert may be formed as part of the insole board 54 or the outsole 32.

Figure 8:
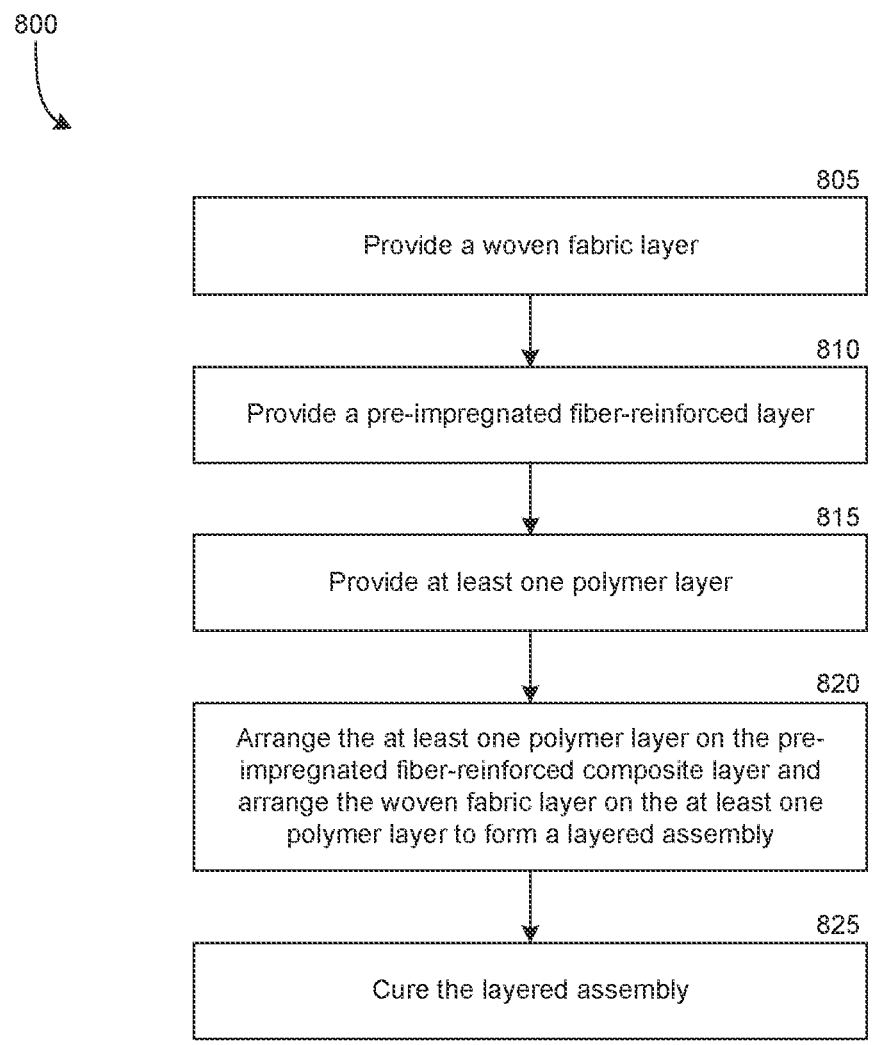
FIG. 8 is a schematic flow chart regarding a method of manufacturing the footwear insert of FIG. 1 in accordance with an embodiment of the present technology.

FIG. 8 shows a method 800 of forming a layered composite assembly (e.g., composite assembly 12) having anisotropic bending and puncture resistant properties. At step 805, a first layer is provided. The first layer is formed from a plurality of sheets of woven mesh fabric stacked together and bonded to each other. The sheets of fabric are mechanically joined to each other (e.g., needled or stitched) and a bonding agent (e.g., an adhesive) applied between the layers further binds the layers together. In a preferred embodiment, the first layer comprises polyester fabric and the woven fabric layer has a thickness in the range of approximately 2.0 mm-5.00 mm thick.

At step 810, a second layer is provided. The second layer can be a pre-impregnated fiber-reinforced composite layer having fabric, which may be formed from one or more layers of synthetic or other fibers woven together, impregnated with an uncured epoxy. In at least one embodiment, the fibers comprise fiberglass and the epoxy comprises a thermoset epoxy. The fiberglass fibers are woven together to form one or more sheets of fabric, and the thermoset epoxy is applied to the fiberglass fabric in order to impregnate the fiberglass with the epoxy. At step 815, at least one polymer layer can be provided. The polymer layer comprises one or more thin sheets of a block copolymer having polymer chains arranged in a network.

At step 820, the polymer layers are arranged on the second layer and the first layer is arranged on the polymer layer. In some embodiments, only a single polymer layer is provided and applied to the composite layer, such that the first and second layers are only separated by a single sheet of the block copolymer. In other embodiments, two or more polymer layers are provided such that the first and second layers are separated from each other by two or more sheets of the block copolymer.

At step 825, the entire assembly is cured. The assembly may be placed in a heat forming tool (e.g., a heat press) that applies pressure and heat to the assembly, causing the first, second, and polymer layers to bind and fixedly attach to each other. In a preferred embodiment, the assembly is heated to approximately 280° F. and a exposed to a pressure in the range of approximately 30-50 psi for approximately 20 minutes. The elevated pressure and temperature causes the epoxy to flow around the synthetic fibers of the composite layer and to flow at least partially into the woven fabric layer. However, the polymer layer acts as an interfacing layer that limits the flow of the epoxy into the woven fabric layer and further acts as an adhesive that aids in bonding the fabric layer to the composite layer, thereby co-curing the fabric layer, composite layer, and interfacing layer. Once the epoxy cures and the fiber-reinforced composite layer hardens, the assembly is allowed to cool until the epoxy is completely set. In another embodiment, the hard layer can be cured under appropriate heat and pressure as a first step. The cured hard layer can then be pressed together with the soft and an intermediate polymer layer and heated to approximately 280 F and exposed to a pressure in the range of approximately 25-40 psi for approximately 10-20 minutes. In in some embodiments, the process can be such that the epoxy does not penetrate the fibrous soft material.

While the technology has been particularly shown and described as referenced to the embodiments thereof, those skilled in the art will understand that the foregoing and other changes in form and detail may be made therein without departing from the spirit and scope of the invention. The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. An anti-puncture footwear insert configured to be incorporated into a sole assembly for an article of footwear and having anisotropic bending properties, the footwear insert comprising:
a first layer shaped and sized to fit in the article of footwear and having a compressive modulus and a tensile modulus greater than the compressive modulus;
a second layer shaped and sized to fit in the article of footwear and comprising a fiber reinforced material positioned under the first layer;
a neutral bending plane disposed in the first layer; and
an interfacing layer interposed between the first layer and the second layer configured to act as an adhesive to bond the first layer to the second layer,
wherein—
the footwear insert has a high resistance to bending in a first direction relative to the neutral bending plane and a low resistance to bending in a second direction opposite the first direction, and
the first layer is configured to be in tension when the footwear insert bends in the first direction and in compression when the footwear insert bends in the second direction.

2. The footwear insert of claim 1 wherein the first layer comprises fabric having a plurality of sheets of woven material stitched together.

3. The footwear insert of claim 2 wherein the woven material comprises a material selected from the group consisting of polyester, Kevlar, and Dyneema.

4. The footwear insert of claim 1 wherein the fiber reinforced material comprises a fiber material impregnated with an epoxy.

5. The footwear insert of claim 4 wherein the first layer, the second layer, and the interfacing layer are co-cured together such that the fiber material is at least partially impregnated with the interfacing layer and the epoxy.

6. The footwear insert of claim 4 wherein the fiber material comprises fiberglass.

7. The footwear insert of claim 1 wherein the first direction is a dorsal flex direction and the second direction is a plantar flex direction.

8. The footwear insert of claim 1 wherein the first or second layer has a foot-shaped layout that includes a heel portion and an opposing forefoot portion.

9. The footwear insert of claim 1 wherein the first layer comprises one or more layers of fabric.

10. The footwear insert of claim 1 wherein the first layer comprises a woven fabric.

11. A footwear assembly, comprising:
an upper configured to receive a foot; and
a sole assembly coupled to the upper, wherein the sole assembly comprises:
an outsole;
a midsole coupled to the outsole; and
a footwear insert coupled to the midsole, wherein the footwear insert comprises:
a dorsal layer comprising fabric;
a plantar layer comprising a fiber reinforced material positioned under the dorsal layer;
an interfacing layer between the plantar layer and the dorsal layer and configured to bond the dorsal layer to the plantar layer; and
a neutral bending plane disposed in the dorsal layer;
wherein the footwear insert has a high resistance to bending in a first direction relative to the neutral bending plane and a low resistance to bending in a second direction opposite the first direction to provide anisotropic bending of the sole assembly during use of the footwear assembly, and
wherein the dorsal layer is configured to be (i) in tension when the footwear insert bends in the first direction and (ii) in compression when the footwear insert bends in the second direction.

12. The footwear assembly of claim 11 wherein the fiber reinforced material comprises a fiberglass weave embedded within an epoxy.

13. The footwear assembly of claim 12 wherein the fabric comprises a plurality of sheets of woven polyester fabric stitched together.

14. The footwear assembly of claim 13 wherein the woven polyester fabric has a compressive modulus and a tensile modulus greater than the compressive modulus.

15. The footwear assembly of claim 14 wherein the first direction is a dorsal flex direction and the second direction is a plantar flex direction.

16. The footwear assembly of claim 11 wherein the interfacing polymer-layer comprises a polymer and wherein the fabric of the dorsal layer is at least partially impregnated with the polymer.

17. The footwear assembly of claim 16 wherein the fiber reinforced material comprises a fiberglass weave impregnated with an epoxy and wherein the fabric of the dorsal layer is at least partially impregnated with the polymer and the epoxy.

18. The footwear assembly of claim 11 wherein the midsole comprises a polymer-based layer and wherein the footwear insert is completely embedded within the polymer-based layer.

19. The footwear assembly of claim 11 wherein the footwear insert has a foot-shaped layout that includes a heel portion and an opposing forefoot portion.

* * * * *